(12) United States Patent
Van Nieuwstadt et al.

(10) Patent No.: US 11,466,636 B1
(45) Date of Patent: Oct. 11, 2022

(54) SYSTEM AND METHOD FOR DETECTING A SENSOR OFFSET

(71) Applicant: Ford Global Technologies, LLC, Dearborn, MI (US)

(72) Inventors: Michiel J Van Nieuwstadt, Ann Arbor, MI (US); Justin Trzeciak, Riverview, MI (US); Jim Bromham, Trowbridge (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/225,954

(22) Filed: Apr. 8, 2021

(51) Int. Cl.
F02D 41/14 (2006.01)

(52) U.S. Cl.
CPC .... F02D 41/1462 (2013.01); *F01N 2560/026* (2013.01)

(58) Field of Classification Search
CPC combination set(s) only.
See application file for complete search history.

(56) References Cited

U.S. PATENT DOCUMENTS

| | | | |
|---|---|---|---|
| 7,159,551 B2 | 1/2007 | Cecur et al. | |
| 7,404,383 B2 | 7/2008 | Elendt | |
| 8,336,525 B2 | 12/2012 | Runde et al. | |
| 8,635,007 B2* | 1/2014 | Balenovic | F01N 3/208 701/114 |
| 8,930,121 B2 | 1/2015 | Rajagopalan et al. | |
| 9,080,488 B2 | 7/2015 | Upadhyay et al. | |
| 9,429,059 B2 | 8/2016 | Riffle et al. | |
| 9,605,603 B2 | 3/2017 | Glugla et al. | |
| 9,624,804 B2 | 4/2017 | Matsumoto et al. | |
| 10,513,961 B2 | 12/2019 | Yoo et al. | |
| 2011/0185707 A1* | 8/2011 | Upadhyay | F01N 3/18 60/274 |
| 2016/0186630 A1* | 6/2016 | Osburn | F01N 3/2066 60/274 |
| 2017/0350291 A1* | 12/2017 | Khaled | F01N 13/008 |
| 2019/0024563 A1* | 1/2019 | Wang | F01N 11/00 |
| 2019/0203623 A1* | 7/2019 | Yoo | F01N 3/2066 |
| 2019/0331044 A1* | 10/2019 | Minaz | F02D 41/1497 |

* cited by examiner

*Primary Examiner* — Binh Q Tran (74) *Attorney, Agent, or Firm* — Vincent Mastrogiacomo; McCoy Russell LLP (57) ABSTRACT

Methods and systems for monitoring a NOx sensor for a NOx offset value are described. In one example, the NOx offset value may be based on a minimum NOx concentration observed over an entire drive of a vehicle. The NOx offset monitor may be inhibited in response to inferring or detecting a presence of $NH_3$ in an exhaust system.

19 Claims, 5 Drawing Sheets

SYSTEM AND METHOD FOR DETECTING A SENSOR OFFSET

BACKGROUND/SUMMARY

An exhaust after treatment system may include a NOx sensor for detecting the presence or absence of NOx in exhaust gas. The NOx sensor may output a value that includes an offset from the actual concentration of NOx that is sensed via the NOx sensor. The offset may introduce error into to NOx concentrations that are based on NOx sensor output. Therefore, it may be desirable to accurately determine a NOx sensor offset. One way to determine a NOx sensor offset may be to sense NOx sensor output when an engine torque request has decreased by a threshold amount for a threshold amount of time, such as when a driver demand pedal is released (e.g. a tip-out) or when an autonomous driver reduces a torque or power command. However, during a vehicle drive, there may be times when very few tip-outs are present. Therefore, NOx offset values may be based on few observations, which may lower confidence levels in the NOx offset values. In addition, NOx sensors may respond to compounds other than NOx, which may reduce accuracy of sensed NOx. Accordingly, it may be desirable to provide a way of improving estimates of NOx sensor NOx offset values.

The inventors herein have recognized the above-mentioned disadvantages and have developed a method for estimating an offset of a NOx sensor, comprising: sampling output of the NOx sensor via a controller at a predetermined rate throughout a vehicle drive to generate a plurality of NOx concentration values; storing a smallest NOx concentration value from the plurality of NOx concentration values to memory of the controller; and reporting the smallest NOx concentration value as the offset of the NOx sensor.

By tracking NOx values output by a NOx sensor during an entire vehicle drive, it may be possible to reliably determine a NOx offset value of a NOx sensor. For example, NOx sensor output NOx values may be estimated during vehicle coasting, times of fuel cut-off, and other low engine load conditions where NOx may be expected to be low so that a NOx offset value may be determined from a larger data set, which may lead to improved NOx offset value estimates. In addition, determination of NOx offset values during conditions where a $NH_3$ cloud forms in an engine exhaust system, may be inhibited so that the NOx offset value is not biased due to $NH_3$, which may occur during a tip-out.

The present description may provide several advantages. In particular, the approach may improve NOx offset value determination. In addition, the approach may reduce a possibility of a NOx offset value being biased due to $NH_3$. Further, the approach may be implemented at a low cost.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to improving estimates of NOx observed in an exhaust system of an engine. A NOx sensor may be included with an engine of the type shown in FIG. 1.

Figure 2:
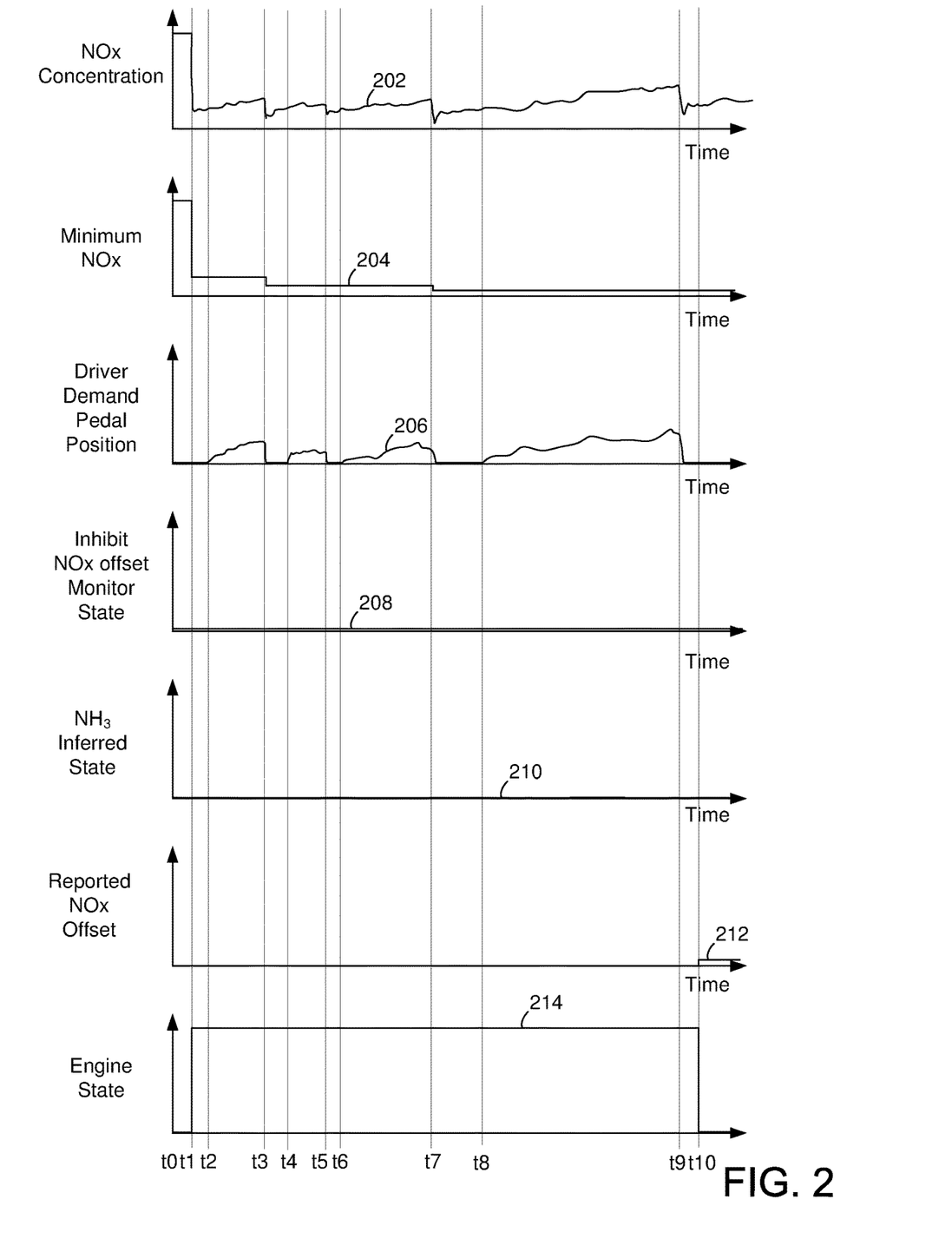
FIGS. 2 and 3 show example sequences according to the method of FIGS. 4 and 5.
Figure 3:
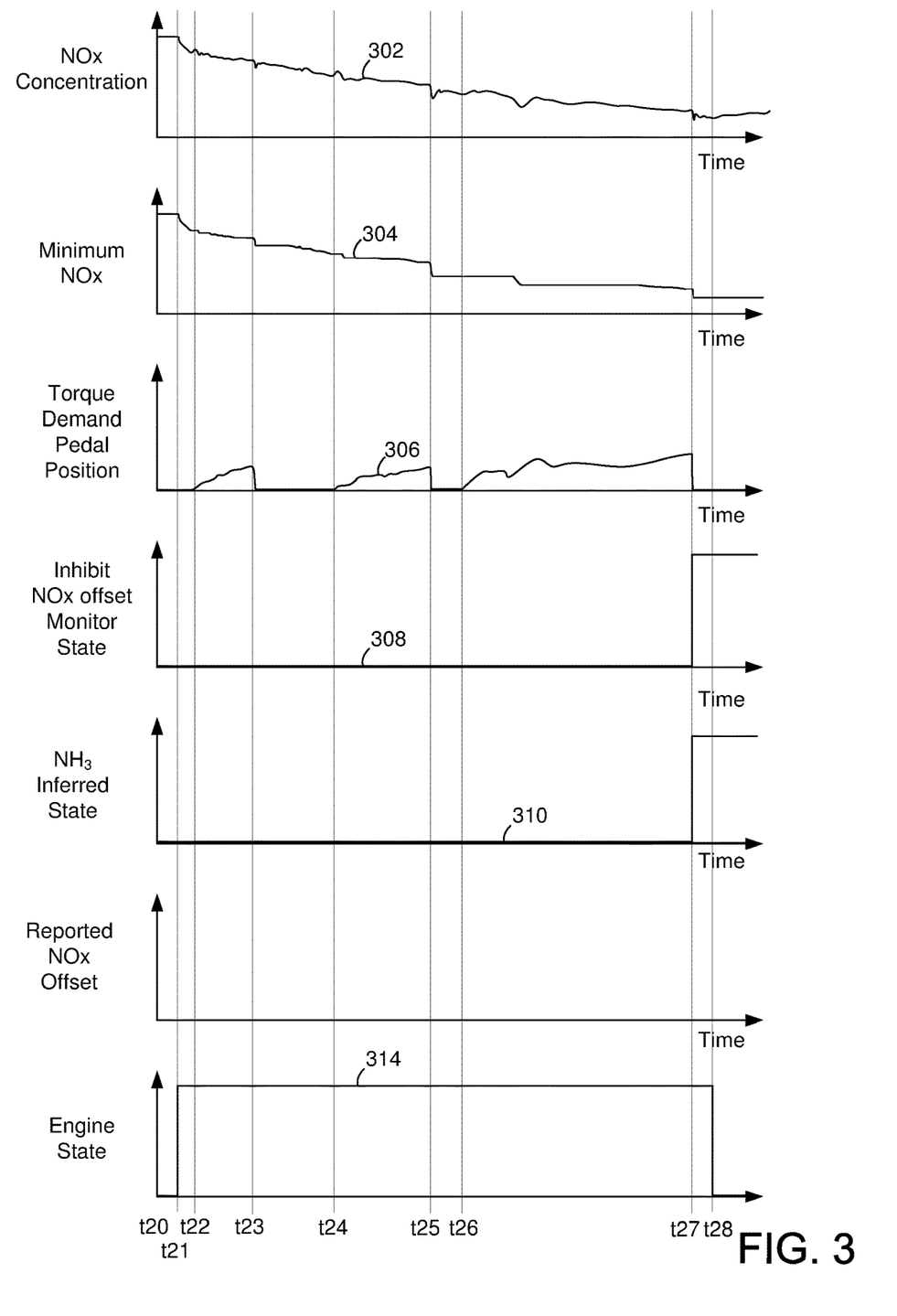

The NOx sensor may provide feedback NOx concentration levels to a controller so that the controller may control engine NOx with in a desired range. The controller may include instructions for determining and reporting NOx offset values as illustrated in FIGS. 2 and 3. The NOx offset values may be determined according to the methods of FIGS. 4 and 5.

Figure 1:
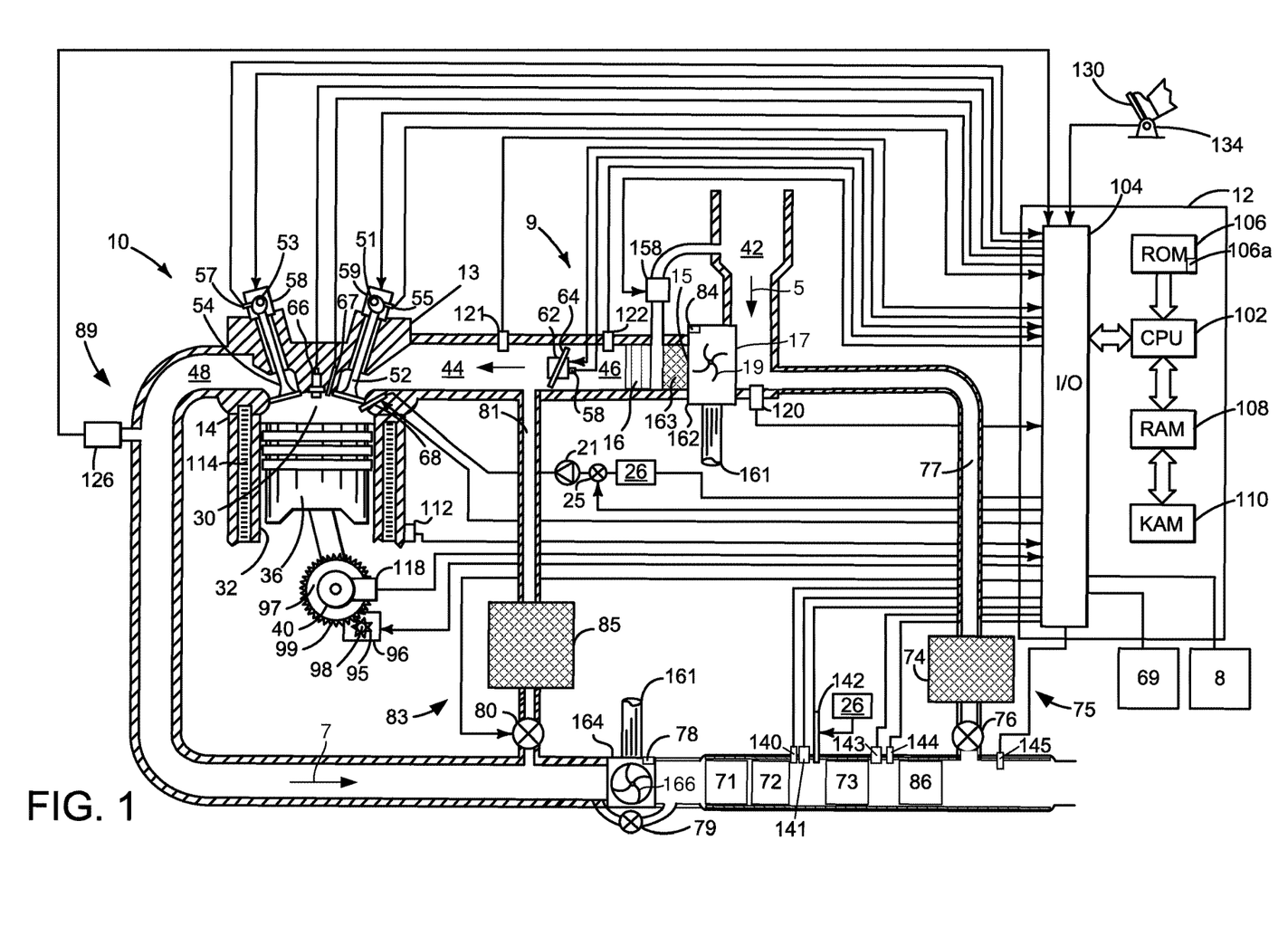
FIG. 1 shows a detailed schematic depiction of an example engine.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may a cam driven valve operator (e.g., as shown in U.S. Pat. Nos. 9,605,603; 7,404,383; and 7,159,551 all of which are hereby fully incorporated by reference for all purposes). Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, grid heater 16, charge air cooler 163, turbocharger compressor 162, and intake plenum 42. However, in some examples, some of the components shown herein may be omitted. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started.

Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, driver demand pedal position, battery SOC, etc.). Battery 8 may supply electrical power to starter 96. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. Exhaust gases may be processed via exhaust system 89, which may include sensors and emissions control devices as described herein. In some examples, a NOx or combined NOx and oxygen sensor 126 may be coupled to exhaust manifold 48 upstream of emissions device 71. In other examples, the NOx sensor may be located downstream of one or more exhaust after treatment devices.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via optional pressure sensor 67, alternatively or in addition, sensor 67 may also sense cylinder temperature.

Emissions device 71 may include an oxidation catalyst and it may be followed by a selective catalytic reduction (SCR) catalyst or other exhaust gas after treatment device. Exhaust system 89 may also include a diesel exhaust catalyst (DEC) 73 and a diesel particulate filter (DPF) 86. The DEC 73 may be positioned upstream of the DPF 86 so that heat from the DEC 73 may be transferred to the DPF 86 during DPF regeneration (e.g., oxidation of soot within the DPF). In other examples, a LNT may be placed at 73 or 86. Exhaust flows in the direction that is indicated by arrow 7.

Exhaust system 89 may also include a temperature sensor 140 and an oxygen sensor 141 that are positioned upstream of injector 142 according to the direction of exhaust flow. Exhaust system 89 also includes a downstream oxygen sensor 143, a first downstream temperature sensor 144, and a second downstream temperature sensor 145. Injector may inject a reductant (e.g., diesel fuel) from tank 26. An exhaust gas air-fuel ratio differential may be determined across injector 142 by subtracting an air-fuel ratio sensed via oxygen sensor 141 from an air-fuel ratio sensed by oxygen sensor 143. In some examples, oxygen sensor 143 may be positioned downstream of DPF 86. Alternatively, an exhaust gas oxygen concentration differential may be determined across injector 142 by subtracting an oxygen concentration sensed via oxygen sensor 141 from an oxygen concentration sensed by oxygen sensor 143. A temperature differential across DEC 73 may be determined by subtracting a temperature observed by temperature sensor 144 from a temperature observed by temperature sensor 140. In addition, a temperature differential across DEC 73 and DPF 86 may be determined by subtracting a temperature observed by temperature sensor 145 from a temperature observed by temperature sensor 140.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of DPF 86 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Read-only memory 106 may include a plurality of software modules 106*a* that perform specific engine control functions (e.g., fuel injection control, EGR control, emissions control). Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand torque or power pedal 130; a measurement of engine manifold pressure (MAP) from pressure sensor 121 coupled to intake manifold 44 (alternatively or in addition sensor 121 may sense intake manifold temperature); boost pressure from pressure sensor 122, exhaust gas NOx concentration from NOx sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for a NOx offset monitor system, comprising: a NOx sensor; a controller including executable instructions stored in non-transitory memory that cause the controller to inhibit reporting of a NOx sensor offset value in response to at least an indication of an $NH_3$ plume in an engine exhaust system. The NOx offset monitor system further comprises reporting the NOx sensor offset value in response to inhibiting reporting of the NOx sensor offset value for an actual total number of vehicle drives exceeding a threshold. The NOx offset monitor system includes where the indication of the $NH_3$ plume is based on a minimum difference of a sampled output of the NOx sensor between successive tip-outs. The NOx offset monitor system includes where the indication of the $NH_3$ plume is further based on a slope of the sampled output of the NOx sensor versus engine run time. The NOx offset monitor system further comprises additional executable instructions to sample output of the NOx sensor at a predetermined rate throughout a vehicle drive to generate a plurality of NOx concentration values. The NOx offset monitor system further comprises additional executable instructions to store a smallest NOx concentration value from the plurality of NOx concentration values to memory of the controller. The NOx offset monitor system further comprises additional executable instructions to report the smallest NOx concentration value as a NOx sensor offset value. The NOx offset monitor system further comprises additional executable instructions to inhibit reporting of a NOx sensor offset value in response to a total number of tip-outs during a vehicle drive being less than a threshold.

Turning now to FIG. 2, an example prophetic sequence for determining a NOx offset value of a NOx sensor is shown. The sequence of FIG. 2 may be provided via the system of FIG. 1 and the method of FIGS. 4 and 5. The operating sequence of FIG. 2 may be provided via the system of FIG. 1 executing instructions according to the method of FIGS. 4 and 5 that are stored in non-transitory memory. Vertical markers t0-t10 represent times of interest during the sequence. All plots in FIG. 2 are aligned in time and occur at a same time.

The first plot from the top of FIG. 2 is a plot of NOx concentration indicated by output of a NOx sensor versus time. The vertical axis represents NOx concentration and NOx concentration increases in the direction of the vertical axis arrow. NOx concentration at the level of the horizontal axis is zero. The horizontal axis represents time and time increases from the left side of the plot to the right side of the plot. Curve 202 represents the NOx concentration in the engine exhaust gases in the engine exhaust system as determined via a NOx sensor.

The second plot from the top of FIG. 2 is a plot of a minimum NOx concentration that has been output via the NOx sensor during a present vehicle drive versus time. In one example, a vehicle drive begins at key-on (e.g., insertion of a key into a key switch and moving the key to an "ON" position) and the vehicle drive ends at key-off (e.g., removal of the vehicle key from a key switch). In some examples, the vehicle drive may begin when a pushbutton is applied after a vehicle is "OFF" and the drive ends when the pushbutton is applied a second time to deactivate the vehicle. If the vehicle is an autonomous vehicle, a drive may begin by starting an engine and the drive may end when the engine is stopped, where engine stops for automatic engine stop/start to conserve fuel and fuel cut-out conditions do not qualify as engine stops. The vertical axis represents the NOx concentration and the NOx concentration increases in the direction of the vertical axis arrow. The horizontal axis represents time and time increases from the left side of the plot to the right side of the plot. Curve 204 represents the minimum NOx.

The third plot from the top of FIG. 2 is a plot of driver demand pedal position versus time. The vertical axis represents driver demand pedal position and driver demand pedal position increases in the direction of the vertical axis arrow. The driver demand pedal positon is zero at the level of the horizontal axis. The horizontal axis represents time and time increases from the left side of the plot to the right side of the plot. Curve 206 represents the driver demand pedal position.

The fourth plot from the top of FIG. 2 is a plot of a NOx offset monitor state versus time. The vertical axis represents NOx offset monitor state and the NOx offset monitor is inhibited when trace 208 is near a level of the vertical axis arrow. The NOx offset monitor is not inhibited when trace 208 is near a level of the horizontal axis. The horizontal axis represents time and time increases from the left side of the plot to the right side of the plot. Line 208 represents the NOx monitor state.

The fifth plot from the top of FIG. 2 is a plot of a $NH_3$ inferred state versus time. The vertical axis represents $NH_3$ inferred state and the $NH_3$ inferred is present or indicated when trace 210 is near a level of the vertical axis arrow. The $NH_3$ inferred is not present or indicated when trace 210 is near a level of the horizontal axis. The horizontal axis represents time and time increases from the left side of the plot to the right side of the plot. Line 210 represents the $NH_3$ inferred state.

The sixth plot from the top of FIG. 2 is a reported NOx offset value versus time. The vertical axis represents the NOx offset value and the NOx offset value increases in the direction of the vertical axis arrow. The NOx offset value is zero at the level of the horizontal axis. The horizontal axis represents time and time increases from the left side of the plot to the right side of the plot. Line 212 represents the NOx offset value that is reported to the controller.

The seventh plot from the top of FIG. 2 is a plot of engine state versus time. The vertical axis represents engine state and the engine is running (e.g., rotating and combusting fuel) when trace 214 is near a level of the vertical axis arrow. The engine is stopped (e.g., not rotating and not combusting fuel) when trace 214 is near a level of the horizontal axis. The horizontal axis represents time and time increases from the left side of the plot to the right side of the plot. Line 214 represents the engine state.

At time t0, the engine is stopped and the minimum NOx value is high. The driver demand pedal is not applied and the NOx offset monitor is not inhibited. $NH_3$ is not presently inferred and the NOx offset value is not being reported.

At time t1, the engine is started and it begins to combust air and fuel as indicated by the engine state transitioning to a high level. A new vehicle drive begins. The NOx concentration value declines, and with it, the minimum NOx level declines. The driver demand pedal is not applied and NOx offset monitor is not inhibited. $NH_3$ is not inferred and the NOx offset value is not reported.

At time t2, the engine remains activated and the driver demand pedal is applied. The minimum NOx value is unchanged and the NOx concentration value increases as the driver demand increases. The NOx offset monitor is not inhibited and $NH_3$ is not inferred. The NOx offset value is not reported. The NOx offset value is not reported because a threshold number of tip-outs have not been observed and because the engine remains active.

At time t3, the engine remains activated and the driver demand pedal is released such that a tip-out occurs. The NOx concentration falls and the minimum NOx level is reduced to the level of the lowest NOx concentration level up to the present time in the vehicle drive. $NH_3$ is not inferred and the NOx offset value is not reported. The engine remains activated.

At time t4, the driver demand pedal is applied a second time and the NOx concentration level increases. The minimum NOx level is unchanged and the NOx offset monitor is not inhibited. $NH_3$ is not inferred and the NOx offset value is not reported. The engine remains running.

At time t5, the engine remains activated and the driver demand pedal is released a second time to generate a second tip-out. The NOx concentration falls, but the minimum NOx level is unchanged since the present NOx level is not the lowest value recording during the present vehicle drive. $NH_3$ is not inferred and the NOx offset value is not reported. The engine remains activated.

At time t6, the driver demand pedal is applied a third time and the NOx concentration level increases. The minimum NOx level is unchanged and the NOx offset monitor is not inhibited. $NH_3$ is not inferred and the NOx offset value is not reported. The engine remains running.

At time t7, the engine remains activated and the driver demand pedal is released a third time to generate a third tip-out. The NOx concentration falls to a new low so the minimum NOx level is reduced to a new low for the present vehicle drive. $NH_3$ is not inferred and the NOx offset value is not reported. The engine remains activated. The NOx offset value is not reported even though a threshold number of tip-outs have been observed (three in this example) because the engine remains active.

At time t8, the driver demand pedal is applied a fourth time and the NOx concentration level increases. The minimum NOx level is unchanged and the NOx offset monitor is not inhibited. $NH_3$ is not inferred and the NOx offset value is not reported. The engine remains running.

At time t9, the engine remains activated and the driver demand pedal is released a fourth time to generate a fourth tip-out. The NOx concentration falls, but the minimum NOx level is unchanged since the present NOx level is not the lowest value recording during the present vehicle drive. $NH_3$ is not inferred and the NOx offset value is not reported. The engine remains activated.

At time t10, the engine is stopped so the NOx offset value is reported. Reporting the NOx offset value may include making the NOx offset value available to software modules within the controller. For example, the NOx offset value may now be a basis to determine a NOx concentration level that is output from the NOx sensor. The NOx offset value may be applied to increase or decrease the NOx concentration value that is determined from output of the NOx sensor. The NOx offset value is equal to the minimum NOx level. $NH_3$ is not inferred and the vehicle drive ends.

Thus, a NOx offset value may be determined from a plurality of NOx concentration values that occur during a vehicle drive. In particular, a lowest level of the plurality of NOx concentration values may be selected as the NOx offset value. Selecting the lowest value makes sense because NOx should not be present or at low levels during some conditions of the drive (e.g., during coasting). Further, if the NOx concentration value is negative, it is a NOx offset level since NOx concentrations cannot be negative.

Referring now to FIG. 3, a second example prophetic sequence for a NOx offset monitor (e.g., the method of FIG. 4 and %) is shown. The sequence of FIG. 3 may be provided via the system of FIG. 1 and the method of FIGS. 4 and 5. The operating sequence of FIG. 3 may be provided via the system of FIG. 1 executing instructions according to the method of FIGS. 4 and 5 that are stored in non-transitory memory. Vertical markers t20-t28 represent times of interest during the sequence. All plots in FIG. 3 are aligned in time and occur at a same time.

The first plot from the top of FIG. 3 is a plot of NOx concentration indicated by output of a NOx sensor versus time. The vertical axis represents NOx concentration and NOx concentration increases in the direction of the vertical axis arrow. NOx concentration at the level of the horizontal axis is zero. The horizontal axis represents time and time increases from the left side of the plot to the right side of the plot. Curve 302 represents the NOx concentration in the engine exhaust gases in the engine exhaust system as determined via a NOx sensor.

The second plot from the top of FIG. 3 is a plot of a minimum NOx concentration that has been output via the NOx sensor during a present vehicle drive versus time. The vertical axis represents the NOx concentration and the NOx concentration increases in the direction of the vertical axis arrow. The horizontal axis represents time and time increases from the left side of the plot to the right side of the plot. Curve 304 represents the minimum NOx.

The third plot from the top of FIG. 3 is a plot of driver demand pedal position versus time. The vertical axis represents driver demand pedal position and driver demand pedal position increases in the direction of the vertical axis arrow. The driver demand pedal positon is zero at the level of the horizontal axis. The horizontal axis represents time and time increases from the left side of the plot to the right side of the plot. Curve 306 represents the driver demand pedal position.

The fourth plot from the top of FIG. 3 is a plot of a NOx offset monitor state versus time. The vertical axis represents NOx offset monitor state and the NOx offset monitor is inhibited when trace 308 is near a level of the vertical axis arrow. The NOx offset monitor is not inhibited when trace 308 is near a level of the horizontal axis. The horizontal axis represents time and time increases from the left side of the plot to the right side of the plot. Line 308 represents the NOx monitor state.

The fifth plot from the top of FIG. 3 is a plot of a $NH_3$ inferred state versus time. The vertical axis represents $NH_3$ inferred state and the $NH_3$ inferred is present or indicated when trace 310 is near a level of the vertical axis arrow. The $NH_3$ inferred is not present or indicated when trace 310 is near a level of the horizontal axis. The horizontal axis represents time and time increases from the left side of the plot to the right side of the plot. Line 310 represents the $NH_3$ inferred state.

The sixth plot from the top of FIG. 3 is a reported NOx offset value versus time. The vertical axis represents the NOx offset value and the NOx offset value increases in the direction of the vertical axis arrow. The NOx offset value is zero at the level of the horizontal axis. The horizontal axis represents time and time increases from the left side of the plot to the right side of the plot. Line 312 represents the NOx offset value that is reported to the controller.

The seventh plot from the top of FIG. 3 is a plot of engine state versus time. The vertical axis represents engine state and the engine is running (e.g., rotating and combusting fuel) when trace 314 is near a level of the vertical axis arrow. The engine is stopped (e.g., not rotating and not combusting fuel) when trace 314 is near a level of the horizontal axis. The horizontal axis represents time and time increases from the left side of the plot to the right side of the plot. Line 314 represents the engine state.

At time t20, the engine is stopped and the minimum NOx value is high. The driver demand pedal is not applied and the NOx offset monitor is not inhibited. $NH_3$ is not presently inferred and the NOx offset value is not being reported.

At time t21, the engine is started and it begins to combust air and fuel as indicated by the engine state transitioning to a high level. A new vehicle drive begins. The NOx concentration value remains at a high level and it begins to decay at a slow rate. The slow rate of decay may be indicative of presence of a plume (e.g. a cloud or formation) of $NH_3$. The minimum NOx level is a high level. The driver demand pedal is not applied and NOx offset monitor is not inhibited. $NH_3$ is not inferred and the NOx offset value is not reported.

At time t22, the engine remains activated and the driver demand pedal is applied. The minimum NOx value is slowly decreasing, but it temporarily stops decreasing when the driver demand is increased. The NOx concentration value increases as the driver demand increases. The NOx offset monitor is not inhibited and $NH_3$ is not inferred. The NOx offset value is not reported.

The NOx offset value is not reported because a threshold number of tip-outs have not been observed and because the engine remains active.

At time t23, the engine remains activated and the driver demand pedal is released such that a first tip-out occurs during the vehicle drive. The NOx concentration falls and the minimum NOx level is reduced to the level of the lowest NOx concentration level up to the present time in the vehicle drive. $NH_3$ is not inferred and the NOx offset value is not reported. The engine remains activated.

At time t24, the driver demand pedal is applied a second time and the NOx concentration level increases. The minimum NOx level is constant when the driver demand pedal is applied for the second time, but it decreases at a slow rate shortly thereafter. The NOx offset monitor is not inhibited, $NH_3$ is not inferred, and the NOx offset value is not reported. The engine remains running.

At time t25, the engine remains activated and the driver demand pedal is released a second time to generate a second tip-out. The NOx concentration falls and the minimum NOx level is reduced. The minimum NOx level is constant shortly after time t25 since the NOx concentration increases shortly thereafter. $NH_3$ is not inferred and the NOx offset value is not reported. The engine remains activated.

At time t26, the driver demand pedal is applied a third time and the NOx concentration level increases. The minimum NOx level is unchanged and the NOx offset monitor is not inhibited. $NH_3$ is not inferred and the NOx offset value is not reported. The engine remains running.

At time t27, the engine remains activated and the driver demand pedal is released a third time to generate a third tip-out. The NOx concentration falls to a new low so the minimum NOx level is reduced to a new low for the present vehicle drive. $NH_3$ is inferred and the NOx offset monitor is inhibited in response to the inferred $NH_3$. The engine remains activated. The NOx offset value is not reported even though a threshold number of tip-outs have been observed (three in this example) because the engine remains active.

At time t28, the engine is stopped so the NOx offset value is not reported because the NOx offset monitor is inhibited. The controller continues to operate with a NOx offset value that was previously determined (not shown). The minimum NOx level is unchanged and $NH_3$ is still inferred. The vehicle drive ends.

Thus, a NOx offset value may be inhibited when $NH_3$ is inferred during a vehicle drive. If $NH_3$ is detected in subsequent vehicle drives, the NOx offset value may not be reported for those drives. However, if after a predetermined total number of drives have occurred and $NH_3$ is still detected, the minimum NOx value may be reported as the NOx offset so that some NOx based sensor offset may be the basis for determining output of the NOx sensor.

Figure 4:
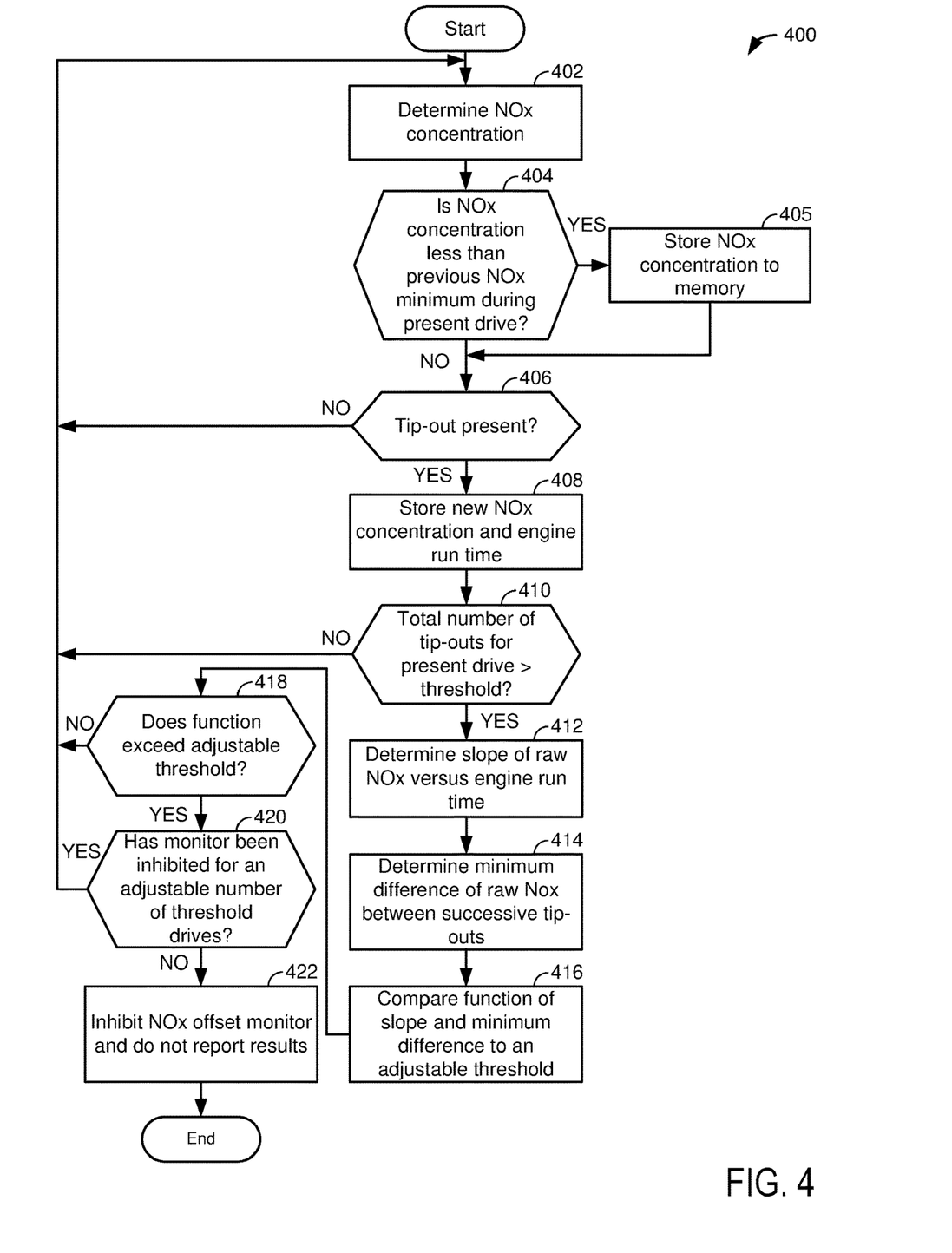
FIGS. 4 and 5 show an example method for determining and applying a NOx offset value.

Referring now to FIG. 4, a method for estimating a NOx offset and a presence or absence of a $NH_3$ plume in an exhaust system is shown. The method of FIG. 4 may be stored as executable instructions in non-transitory memory of a controller in systems such as are shown in FIG. 1. The method of FIG. 4 may be incorporated into and may cooperate with the systems of FIG. 1. Further, portions of the method of FIG. 4 may be performed via a controller transforming operating states of devices and actuators in the physical world. The controller may employ engine actuators of the engine system to adjust engine operation according to the method described below. Further, method 400 may determine selected control parameters as described below from sensor inputs.

At 402, method 400 determines a NOx concentration as measured via a NOx sensor. In one example, method 400 samples voltage output of a NOx sensor via analog to digital converters (ADC) that are included in the controller's inputs and outputs. In other examples, the NOx sensor voltage output may be sensed via ADCs of an application specific integrated circuit (ASIC). A NOx concentration may be delivered to the controller via a controller area network (CAN) or another known communication medium. The voltage output of the NOx sensor may be sampled at a predetermined rate, such as every 100 milliseconds or ever ninety crankshaft degrees. The voltage values may be converted to NOx concentration levels via a transfer function in the controller, such as NOx=Nox_offset+ NOx_volts·NOx_slope, where NOx is the NOx concentration, NOx_offset is the estimated NOx offset, NOx_volts is the output of the NOx sensor, and NOx_slope is a slope of a NOx transfer function or relationship between NOx concentration and NOx sensor output voltage. Method 400 proceeds to 404 after the NOx concentration is determined.

At 404, method 400 judges if the present NOx concentration level or value is less than the most recent prior NOx concentration level (e.g., NOx(i)<NOx(i−1), where i is the sample number). If so, the answer is yes and method 400 proceeds to 405. Otherwise, the answer is no and method 400 proceeds to 406.

At 405, method stores the most recent NOx concentration level (e.g., NOx(i)) into a variable in controller memory that represents the minimum NOx level for the present vehicle drive. At the end of the present vehicle drive, the minimum NOx level may be reported out as the NOx offset value. Method 400 proceeds to 406.

At 406, method 400 judges if there is a tip-out present. A tip-out may be a release of a driver demand pedal without an increase in driver demand pedal position for a predetermined amount of time. Alternatively, a tip-out may be a driver demand reduction greater than a threshold that has been present for a predetermined amount of time without an increase in driver demand. Method 400 may sum all of the tip-outs that occur during the present vehicle drive to determine an actual total number of tip-outs for the present vehicle drive. If method 400 judges that a tip-out is present, the answer is yes and method 400 proceeds to 408. Otherwise, the answer is no and method 400 returns to 402.

At 408, method 400 stores the most recently sampled NOx concentration level and the present engine run time (e.g., the amount of time that the engine has been combusting fuel since a most recent engine start). The most recently sampled NOx concentration level may be referred to as the raw NOx value. Method 400 proceeds to 410.

At 410, method 400 judges if the actual total number of tip-ins for the present vehicle drive exceeds a threshold level (e.g., three). This may allow the controller to establish that NOx detection conditions are established and reliable. If method 400 judges that the actual number of tip-outs is greater than a threshold, the answer is yes and method 400 proceeds to 412. Otherwise, the answer is no and method 400 returns to 402.

At 412, method 400 determines a slope of the raw NOx concentration (e.g., the NOx value stored at 408) versus engine run time. In one example, method 400 applies Least squares to determine a slope of a line to fit the relationship between NOx concentration (e.g., the NOx value stored at step 408) and engine run time (e.g., the engine run time value stored at 408). The relationship may include data from a plurality of tip-outs. The slope may be determined via the following equation:

$$slope = \frac{\left(\sum_{i=1}^{n} Engrt_i NOx_i\right) - (n \cdot \overline{Engrt} \cdot \overline{NOx})}{\sum_{i=1}^{n} Engrt_i^2 - n \cdot \overline{Engrt}^2},$$

where n is the total number of data pairs in the relationship between NOx concentration and engine run time, i is number identifying a present pair of NOx and engine run time, Engrt is the engine run time, and NOx is the NOx concentration. Method 400 proceeds to 414.

At 414, method 400 determines a minimum difference of the raw NOx between successive tip-outs. In one example, the minimum difference may be determined via determining a difference between a present NOx concentration (NOx(i)) and a most recent previous NOx concentration (NOx(i−1)). If the present difference between the present NOx concentration and the most recent previous NOx concentration is less than a previous difference between a first past NOx concentration and a second past NOx concentration, then the difference between the present NOx concentration and the most recent previous NOx concentration is a new minimum difference of the NOx concentration. If the present difference between the present NOx concentration and the most recent previous NOx concentration is greater than or equal to the previous difference between a first past NOx concentration and a second past NOx concentration, then the previous difference between the first past NOx concentration and the second past NOx concentration remains the minimum difference of the NOx concentration. In some examples, method 400 may store past difference values between NOx concentrations in a circular buffer that include a plurality of difference values from which the minimum difference value may be determined. Method 400 proceeds to 416.

At 416, method 400 references a table or function of predetermined values according to the slope determined at 412 and the minimum difference value determined at 414. The table or function outputs a predetermined value. The predetermined values in the table or function may be determined via selecting values based on slopes and minimum difference values when $NH_3$ is sensed in an exhaust system and selecting values based on slopes and minimum difference values when $NH_3$ is not in the exhaust system. As such, the selected values in the table or function may be indicative of the presence or absence of $NH_3$ in the exhaust system. Method 400 proceeds to 418.

At 418, method 400 judges if output of the table or function from step 416 is greater than a predetermined threshold. If so, the answer is yes and method 400 proceeds to 420. Otherwise, the answer is no and method 400 returns to 402. Output of the table or function exceeding the predetermined threshold may be indicative of $NH_3$ in the exhaust system. Thus, the presence or absence of $NH_3$ in the exhaust system may be determined from the slope determined at 412 and the minimum difference determined at 414.

At 420, method 400 judges if the NOx monitor (e.g., the method of FIGS. 4 and 5) has been inhibited from reporting a revised NOx offset value for more than an adjustable or calibratable number of threshold vehicle drives. For example, method 400 may judge whether or not the NOx monitor has been inhibited from reporting a NOx offset value for more than five vehicle drives. If method 400 judges that the NOx monitor has been inhibited from reporting a NOx offset value for more than five vehicle drives, the answer is yes and method 400 returns to 402. By returning to 402, the NOx monitor has not been inhibited for the present vehicle drive since the NOx monitor inhibit state may be cleared at the beginning of each vehicle drive. If method 400 judges that the NOx monitor has not been inhibited from reporting a NOx offset value for more than five vehicle drives, the answer is no and method 400 proceeds to 422.

At 422, method 400 inhibits the NOx offset monitor from reporting a revised NOx offset value to the controller and routines included therein. Method 400 proceeds to exit.

In this way, the NOx monitor may be inhibited or permitted. The presence or absence of $NH_3$ in the exhaust system may be determined when an actual total number of tip-outs for the present vehicle drive exceeds a threshold.

Figure 5:
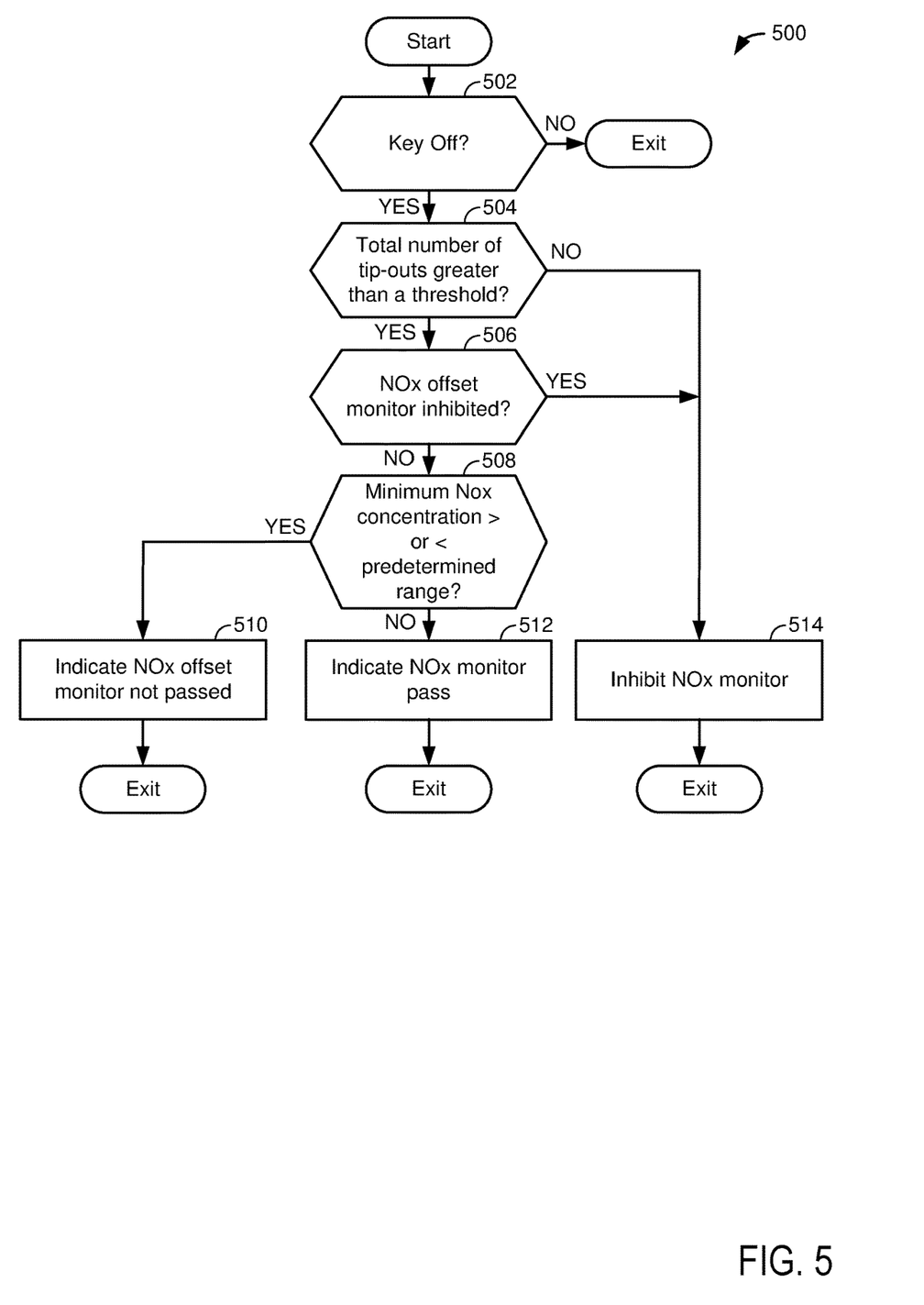

Referring now to FIG. 5, a method for reporting or withholding a NOx offset via a controller is shown. The method of FIG. 5 may be stored as executable instructions in non-transitory memory of a controller in systems such as are shown in FIG. 1. The method of FIG. 4 may be incorporated into and may cooperate with the systems of FIG. 1 and the method of FIG. 4. Further, portions of the method of FIG. 5 may be performed via a controller transforming operating states of devices and actuators in the physical world. The controller may employ engine actuators of the engine system to adjust engine operation according to the method described below. Further, method 500 may determine selected control parameters as described below from sensor inputs.

At 502, method 500 judges if the vehicle is at key off conditions or a key off state. A key off state may be present when a key is switched to off, thereby deactivating the vehicles engine (e.g., engine combustion and rotation is ceased). In vehicles that do not include a key, a key fob, pushbutton, or proximity detection device may perform a function similar to key off that constitutes a key off state or condition. For example, if passengers of an autonomous vehicle exit the proximity of a vehicle with a key fob or phone, the vehicle's engine may be deactivated. If method 500 judges that a key off condition is present, the answer is yes and method 500 proceeds to 504. Otherwise, the answer is no and method 500 proceeds to exit.

At 504, method 500 judges if the actual total number of tip-outs during the most recent past vehicle drive is greater than a threshold (e.g., five). If so, the answer is yes and method 500 proceeds to 506. Otherwise, the answer is no and method 500 proceeds to 514.

At 514, method 500 inhibits the NOx offset monitor and the NOx offset value is not reported. Therefore, an existing NOx offset value that is used to determine NOx concentration values from the output voltage of the NOx sensor remains unchanged and it is still the basis for determining NOx concentration values. Additionally, the NOx monitor is not deemed and/or indicated to be operating in an unexpected way. Method 500 proceeds to exit.

At 506, method 500 judges if the NOx offset monitor is inhibited. The NOx monitor may be inhibited due to the perceived presence of $NH_3$ within the engine exhaust system. If the NOx offset monitor is inhibited, the answer is yes and method 500 proceeds to 514. Otherwise, the answer is no and method 500 proceeds to 508.

At 508, method 500 judges if the minimum NOx concentration determined at 405 is greater than or less than a predetermined range (e.g., less than −50 parts/million or greater than 100 parts/million). If so, the answer is yes and method 500 proceeds to 510. Otherwise, the answer is no and method 500 proceeds to 512.

At 510, method 500 indicates that the NOx offset monitor is not operating as may be expected. Therefore, method 500 does not update the existing NOx offset value. The vehicle's human driver may be notified of such condition via a human/machine interface. Alternatively, the vehicle's autonomous driver may be notified so that service for the vehicle may be performed. Method 500 proceeds to exit.

At 512, method 500 indicates that the NOx offset monitor is operating as may be expected. Therefore, method 500 update the existing NOx offset value with the minimum NOx value that was determined at 405 during the vehicle most recent previous drive. The new NOx offset value may be applied to determine levels of NOx in the vehicle exhaust system. The vehicle controller may increase or decrease an exhaust gas recirculation amount (EGR) via opening or closing an EGR valve in response to a NOx value that is determined using the NOx offset value. Likewise, fuel injection timing may be adjusted (e.g., timing may be advance or retarded and an amount of fuel injected) to increase or decrease NOx in the exhaust system as determined from the output of the NOx sensor and the new NOx offset value. Method 500 proceeds to exit.

In this way, the NOx offset value may be revised after a vehicle drive is complete. In addition, revision of the NOx offset may also be inhibited when $NH_3$ is detected within the engine's exhaust system or when less than a threshold actual total number of tip-outs have occurred during a most recent past vehicle drive.

Thus, the methods of FIGS. 4 and 5 provide for a method for estimating an offset of a NOx sensor, comprising: sampling output of the NOx sensor via a controller at a predetermined rate throughout a vehicle drive to generate a plurality of NOx concentration values; storing a smallest NOx concentration value from the plurality of NOx concentration values to memory of the controller; and reporting the smallest NOx concentration value as the offset of the NOx sensor. The method includes where the reporting occurs when predetermined conditions are met. The method includes where the predetermined conditions include the smallest NOx concentration being with a predetermined range of NOx concentration. The method includes where the predetermined conditions include lack of detection of an $NH_3$ plume, and where detection of the $NH_3$ plume is based on a minimum difference of the sampled output of the NOx sensor between successive tip-outs. The method includes where the detection of the $NH_3$ plume is further based on a slope of the sampled output of the NOx sensor versus engine run time. The method further comprises inhibiting the reporting in response to detection of a $NH_3$ plume. The method includes where the $NH_3$ plume is detected from the sampled output of the NOx sensor.

The methods of FIGS. 4 and 5 also provide for a method for detecting a $NH_3$ plume, comprising: monitoring an exhaust system via a controller for a $NH_3$ plume based on a minimum difference of a sampled output of a NOx sensor between successive tip-outs and a slope of sampled output of the NOx sensor versus engine run time; and inhibiting or permitting a NOx sensor offset monitor in response to a presence or absence of the $NH_3$ plume. The method further comprises storing a single minimum NOx value for a vehicle drive. The method further comprises reporting a NOx offset when the $NH_3$ plume is detected in response to inhibiting the NOx offset monitor for a threshold number of vehicle drives. The method further comprises indicating passing the NOx offset monitor in response to a NOx offset value being within a predetermined range. The method further comprises indicating not passing the NOx offset monitor in response to a NOx offset value not being within a predetermined range.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for estimating an offset of a NOx sensor, comprising:
sampling output of the NOx sensor via a controller at a predetermined rate throughout a vehicle drive to generate a plurality of NOx concentration values;
storing a smallest NOx concentration value from the plurality of NOx concentration values to memory of the controller; and
reporting the smallest NOx concentration value as the offset of the NOx sensor.

2. The method of claim 1, where the reporting occurs when predetermined conditions are met.

3. The method of claim 2, where the predetermined conditions include the smallest NOx concentration being with a predetermined range of NOx concentration.

4. The method of claim 2, where the predetermined conditions include lack of detection of an $NH_3$ plume, and where detection of the $NH_3$ plume is based on a minimum difference of the sampled output of the NOx sensor between successive tip-outs.

5. The method of claim 4, where the detection of the $NH_3$ plume is further based on a slope of the sampled output of the NOx sensor versus engine run time.

6. The method of claim 5, further comprising inhibiting the reporting in response to detection of a $NH_3$ plume.

7. The method of claim 6, where the $NH_3$ plume is detected from the sampled output of the NOx sensor.

8. A NOx offset monitor system, comprising:
a NOx sensor;
a controller including executable instructions stored in non-transitory memory that cause the controller to inhibit reporting of a NOx sensor offset value in response to at least an indication of an $NH_3$ plume in an engine exhaust system, where the indication of the $NH_3$ plume is based on a minimum difference of a sampled output of the NOx sensor between successive tip-outs.

9. The NOx offset monitor system of claim 8, further comprising reporting the NOx sensor offset value in response to inhibiting reporting of the NOx sensor offset value for an actual total number of vehicle drives exceeding a threshold.

10. The NOx offset monitor system of claim 8, where the indication of the $NH_3$ plume is further based on a slope of the sampled output of the NOx sensor versus engine run time.

11. The NOx offset monitor system of claim 8, further comprising additional executable instructions to sample output of the NOx sensor at a predetermined rate throughout a vehicle drive to generate a plurality of NOx concentration values.

12. The NOx offset monitor system of claim 11, further comprising additional executable instructions to store a smallest NOx concentration value from the plurality of NOx concentration values to memory of the controller.

13. The NOx offset monitor system of claim 12, further comprising additional executable instructions to report the smallest NOx concentration value as a NOx sensor offset value.

14. The NOx offset monitor system of claim 8, further comprising additional executable instructions to inhibit reporting of a NOx sensor offset value in response to a total number of tip-outs during a vehicle drive being less than a threshold.

15. A method for detecting a $NH_3$ plume, comprising:
monitoring an exhaust system via a controller for a $NH_3$ plume based on a minimum difference of a sampled output of a NOx sensor between successive tip-outs and a slope of sampled output of the NOx sensor versus engine run time; and inhibiting or permitting a NOx offset monitor in response to a presence or absence of the $NH_3$ plume.

16. The method of claim 15, further comprising storing a single minimum NOx value for a vehicle drive.

17. The method of claim 16, further comprising reporting a NOx offset when the $NH_3$ plume is detected in response to inhibiting the NOx offset monitor for a threshold number of vehicle drives.

18. The method of claim 17, further comprising indicating passing the NOx offset monitor in response to a NOx offset value being within a predetermined range.

19. The method of claim 17, further comprising indicating not passing the NOx offset monitor in response to a NOx offset value not being within a predetermined range.

\* \* \* \* \*